United States Patent
Sadiq et al.

(10) Patent No.: US 10,911,343 B2
(45) Date of Patent: Feb. 2, 2021

(54) BEAM-SPECIFIC TIMING ADVANCE FOR TIMING RESPONSE TRANSMISSION FOR ROUND-TRIP-TIME ESTIMATION

(71) Applicant: QUALCOMM Incorporated, San Diego, CA (US)

(72) Inventors: Bilal Sadiq, Basking Ridge, NJ (US); Navid Abedini, Somerset, NJ (US); Muhammad Nazmul Islam, Littleton, MA (US); Junyi Li, Chester, NJ (US); Naga Bhushan, San Diego, CA (US); Alexandros Manolakos, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 16/418,863

(22) Filed: May 21, 2019

(65) Prior Publication Data

US 2020/0028768 A1 Jan. 23, 2020

(30) Foreign Application Priority Data

Jul. 17, 2018 (GR) .............................. 20180100327

(51) Int. Cl.
*H04W 56/00* (2009.01)
*H04L 12/26* (2006.01)
(Continued)

(52) U.S. Cl.
CPC ....... *H04L 43/0864* (2013.01); *H04B 7/0617* (2013.01); *H04B 17/318* (2015.01); *H04B 17/364* (2015.01)

(58) Field of Classification Search
CPC . H04L 43/0864; H04B 17/318; H04B 17/364; H04B 7/0617
See application file for complete search history.

(56) References Cited

U.S. PATENT DOCUMENTS

2013/0301619 A1 11/2013 Singh et al.
2018/0199360 A1 7/2018 Lin et al.
(Continued)

FOREIGN PATENT DOCUMENTS

EP 3294015 A1 3/2018

OTHER PUBLICATIONS

Huawei, et al., "Considerations on Timing Advance Design in NR", 3GPP TSG RAN WG1 NR Ad Hoc Meeting, 3GPP Draft; R1-1710005, 3rd Generation Partnership Project (3GPP), Mobile Competence Centre, 650, Route Des Lucioles; F-06921 Sophia-Antipolis Cedex; France, vol. RAN WG1, No. Qingdao, P.R. China; Jun. 27, 2017-Jun. 30, 2017, Jun. 26, 2017 (Jun. 26, 2017), 4 Pages, XP051299230, Retrieved from the Internet: URL: http://www.3gpp.org/ftp/Meetings_3GPP_SVNC/RAN1/Docs/ [retrieved on Jun. 26, 2017] the whole document.

(Continued)

*Primary Examiner* — Melvin C Marcelo
(74) *Attorney, Agent, or Firm* — Thien T. Nguyen

(57) ABSTRACT

Disclosed are techniques for determining a beam-specific timing advance for Round-Trip Time (RTT) estimation. In an aspect, a first node receives a plurality of beams transmitted by a second node on a wireless channel, selects a first beam from the plurality of beams for transmitting a timing response, determines a timing statistic, a timing difference, and a timing advance for the first beam, wherein the timing difference comprises a difference between the timing statistic and an earliest time of arrival of the plurality of beams, and wherein the timing advance comprises a multiple of the timing difference, and transmits the timing response for the first beam to the second node on the wireless channel, wherein the first node transmits the timing response after a time delay from the timing statistic of the first beam, (Continued)

wherein the time delay comprises a difference between a predetermined time delay and the timing advance.

30 Claims, 11 Drawing Sheets

(51) Int. Cl.
*H04B 7/06* (2006.01)
*H04B 17/364* (2015.01)
*H04B 17/318* (2015.01)

(56) References Cited

U.S. PATENT DOCUMENTS

2019/0190806 A1\* 6/2019 Bhushan ............... G01S 13/825
2020/0015185 A1\* 1/2020 Sadiq .................... H04W 24/10

OTHER PUBLICATIONS

International Search Report and Written Opinion—PCT/US2019/038549—ISA/EPO—dated Sep. 16, 2019.

\* cited by examiner

BEAM-SPECIFIC TIMING ADVANCE FOR TIMING RESPONSE TRANSMISSION FOR ROUND-TRIP-TIME ESTIMATION

CROSS-REFERENCE TO RELATED APPLICATION

The present Application for Patent claims priority under 35 U.S.C. § 119 to Greek Patent Application No. 20180100327, entitled "BEAM-SPECIFIC TIMING ADVANCE FOR TIMING RESPONSE TRANSMISSION FOR ROUND-TRIP-TIME ESTIMATION," filed Jul. 17, 2018, assigned to the assignee hereof, and expressly incorporated herein by reference in its entirety.

TECHNICAL FIELD

Various aspects described herein generally relate to wireless communication systems, and more particularly, to determining a beam-specific timing advance for the timing response transmission for Round-Trip-Time (RTT) estimation.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 gigahertz (GHz)). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 decibels (dB), relative to that observed in either the 2.4 GHz, or 5 GHz bands.

Propagation loss is also an issue in multiple input-multiple output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity to RF signals that arrive at a receiver along a specific direction. Transmit beamforming and receive beamforming may be used in conjunction with each other or separately, and references to "beamforming" may hereinafter refer to transmit beamforming, receive beamforming, or both, depending on the context. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

Where a transmitter uses beamforming to transmit RF signals, the beams of interest for data communication between the transmitter and receiver will generally be the beams carrying RF signals having the highest received signal strength (or highest received signal to noise plus interference ratio (SINR), for example, in the presence of a directional interfering signal) at the receiver. However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements (e.g., positioning measurements) and the beam with the highest received signal strength is affected by a longer propagation delay, then the beam with the highest received signal strength may not be optimal for the task at hand.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for determining a beam-specific timing advance for RTT estimation includes receiving, at a first node, a plurality of beams transmitted by a second node on a wireless channel, selecting, by the first node, a first beam from the plurality of beams for transmitting a timing response, determining, by the first node, a timing statistic, a timing difference, and a timing advance for the first beam, wherein the timing difference comprises a difference between the timing statistic and an earliest time of arrival of the plurality of beams, and wherein the timing advance comprises a multiple of the timing difference, and transmitting, by the first node, the timing response for the first beam to the second node on the wireless channel, wherein the first node transmits the timing response after a time delay from the timing statistic of the first beam, wherein the time delay comprises a difference between a predetermined time delay and the timing advance.

In an aspect, a method for determining a beam-specific timing advance for RTT estimation includes transmitting, to a first node by a second node, a plurality of beams on a wireless channel, receiving, at the second node from the first node, a timing response for a first beam of the plurality of beams, determining, by the second node, an identifier of the first beam, a timing statistic for the timing response, and a time at which the second node transmitted the first beam, wherein the timing statistic for the timing response comprises a timing statistic other than a time of arrival of the timing response, and determining, by the second node, an RTT between the second node and the first node based on the timing statistic for the timing response, the time at which the second node transmitted the first beam, and a predetermined time delay.

In an aspect, an apparatus for determining a beam-specific timing advance for RTT estimation includes a transceiver of a first node configured to receive a plurality of beams transmitted by a second node on a wireless channel, and at least one processor of the first node configured to: select a first beam from the plurality of beams for transmitting a timing response, determine a timing statistic, a timing difference, and a timing advance for the first beam, wherein the timing difference comprises a difference between the timing statistic and an earliest time of arrival of the plurality of beams, and wherein the timing advance comprises a multiple of the timing difference, and cause the transceiver to transmit the timing response for the first beam to the second node on the wireless channel, wherein the first node transmits the timing response after a time delay from the timing statistic of the first beam, wherein the time delay comprises a difference between a predetermined time delay and the timing advance.

In an aspect, an apparatus for determining a beam-specific timing advance for RTT estimation includes a transceiver of a second node configured to: transmit, to a first node, a plurality of beams on a wireless channel, and receive, from the first node, a timing response for a first beam of the plurality of beams, and at least one processor of the second node configured to: determine an identifier of the first beam, a timing statistic for the timing response, and a time at which the second node transmitted the first beam, wherein the timing statistic for the timing response comprises a timing statistic other than a time of arrival of the timing response, and determine an RTT between the second node and the first node based on the timing statistic for the timing response, the time at which the second node transmitted the first beam, and a predetermined time delay.

In an aspect, an apparatus for determining a beam-specific timing advance for RTT estimation includes a means for communicating of a first node configured to receive a plurality of beams transmitted by a second node on a wireless channel, and a means for processing of the first node configured to: select a first beam from the plurality of beams for transmitting a timing response, determine a timing statistic, a timing difference, and a timing advance for the first beam, wherein the timing difference comprises a difference between the timing statistic and an earliest time of arrival of the plurality of beams, and wherein the timing advance comprises a multiple of the timing difference, and cause the means for communicating to transmit the timing response for the first beam to the second node on the wireless channel, wherein the first node transmits the timing response after a time delay from the timing statistic of the first beam, wherein the time delay comprises a difference between a predetermined time delay and the timing advance.

In an aspect, an apparatus for determining a beam-specific timing advance for RTT estimation includes a means for communicating of a second node configured to: transmit, to a first node, a plurality of beams on a wireless channel, and receive, from the first node, a timing response for a first beam of the plurality of beams, and a means for processing of the second node configured to: determine an identifier of the first beam, a timing statistic for the timing response, and a time at which the second node transmitted the first beam, wherein the timing statistic for the timing response comprises a timing statistic other than a time of arrival of the timing response, and determine an RTT between the second node and the first node based on the timing statistic for the timing response, the time at which the second node transmitted the first beam, and a predetermined time delay.

In an aspect, a computer-readable medium storing computer-executable instructions for determining a beam-specific timing advance for RTT estimation includes the computer-executable instructions comprising at least one instruction instructing a first node to receive a plurality of beams transmitted by a second node on a wireless channel, at least one instruction instructing the first node to select a first beam from the plurality of beams for transmitting a timing response, at least one instruction instructing the first node to determine a timing statistic, a timing difference, and a timing advance for the first beam, wherein the timing difference comprises a difference between the timing statistic and an earliest time of arrival of the plurality of beams, and wherein the timing advance comprises a multiple of the timing difference, and at least one instruction instructing the first node to transmit the timing response for the first beam to the second node on the wireless channel, wherein the first node transmits the timing response after a time delay from the timing statistic of the first beam, wherein the time delay comprises a difference between a predetermined time delay and the timing advance.

In an aspect, a computer-readable medium storing computer-executable instructions for determining a beam-specific timing advance for RTT estimation includes the computer-executable instructions comprising at least one instruction instructing a second node to transmit, to a first node, a plurality of beams on a wireless channel, at least one instruction instructing the second node to receive, from the first node, a timing response for a first beam of the plurality of beams, at least one instruction instructing the second node to determine an identifier of the first beam, a timing statistic for the timing response, and a time at which the second node transmitted the first beam, wherein the timing statistic for the timing response comprises a timing statistic other than a time of arrival of the timing response, and at least one instruction instructing the second node to determine an RTT between the second node and the first node based on the timing statistic for the timing response, the time at which the second node transmitted the first beam, and a predetermined time delay.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
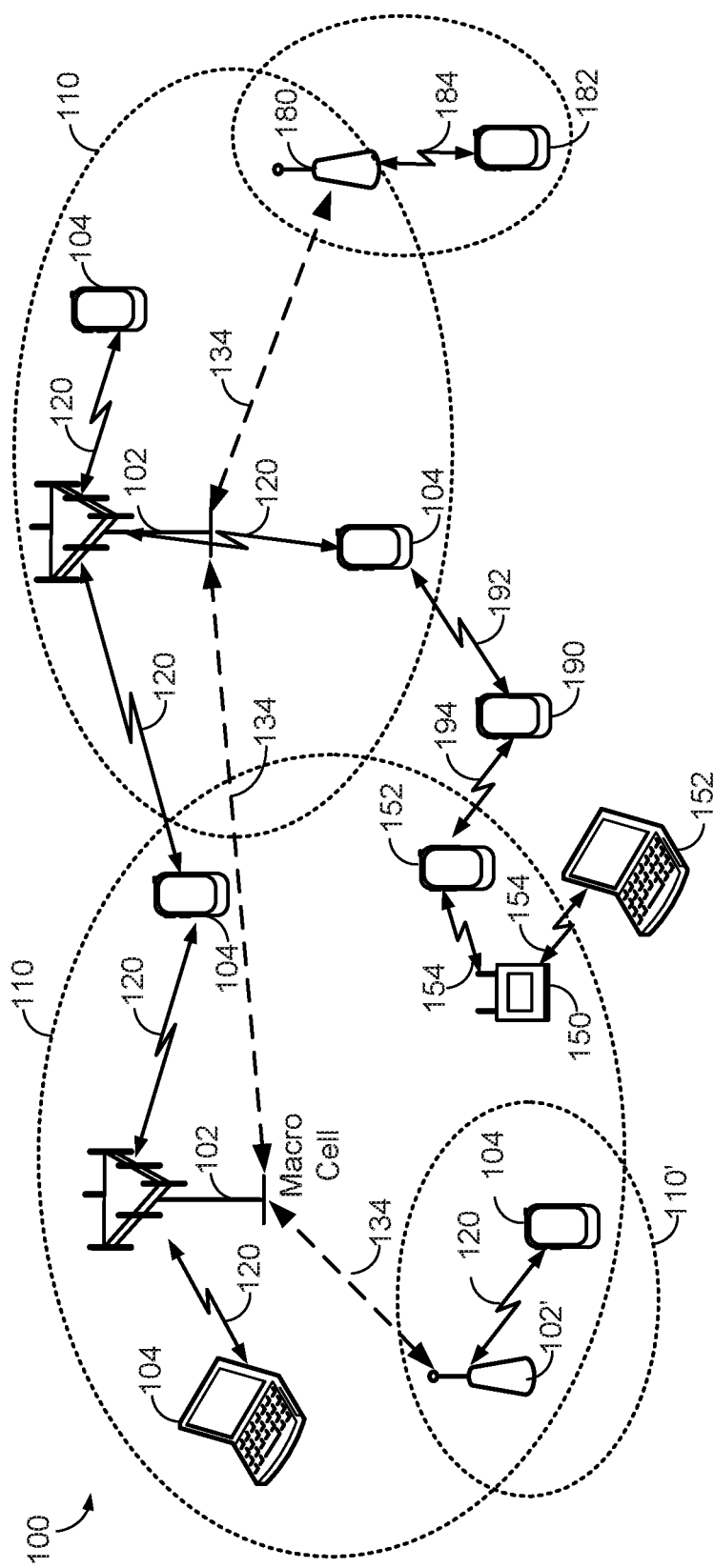
FIG. 1 illustrates an exemplary wireless communications system, according to various aspects.

Various aspects described herein generally relate to wireless communication systems, and more particularly, to determining a beam-specific timing advance for the timing response transmission for RTT estimation.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a RAN and interface with an evolved packet core (EPC) or next generation core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire®.

Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The wireless communications system 100 may further include a mmW base station 180 that may operate in mmW frequencies and/or near mmW frequencies in communication with a UE 182. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connect indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth®, and so on.

Figure 2A:
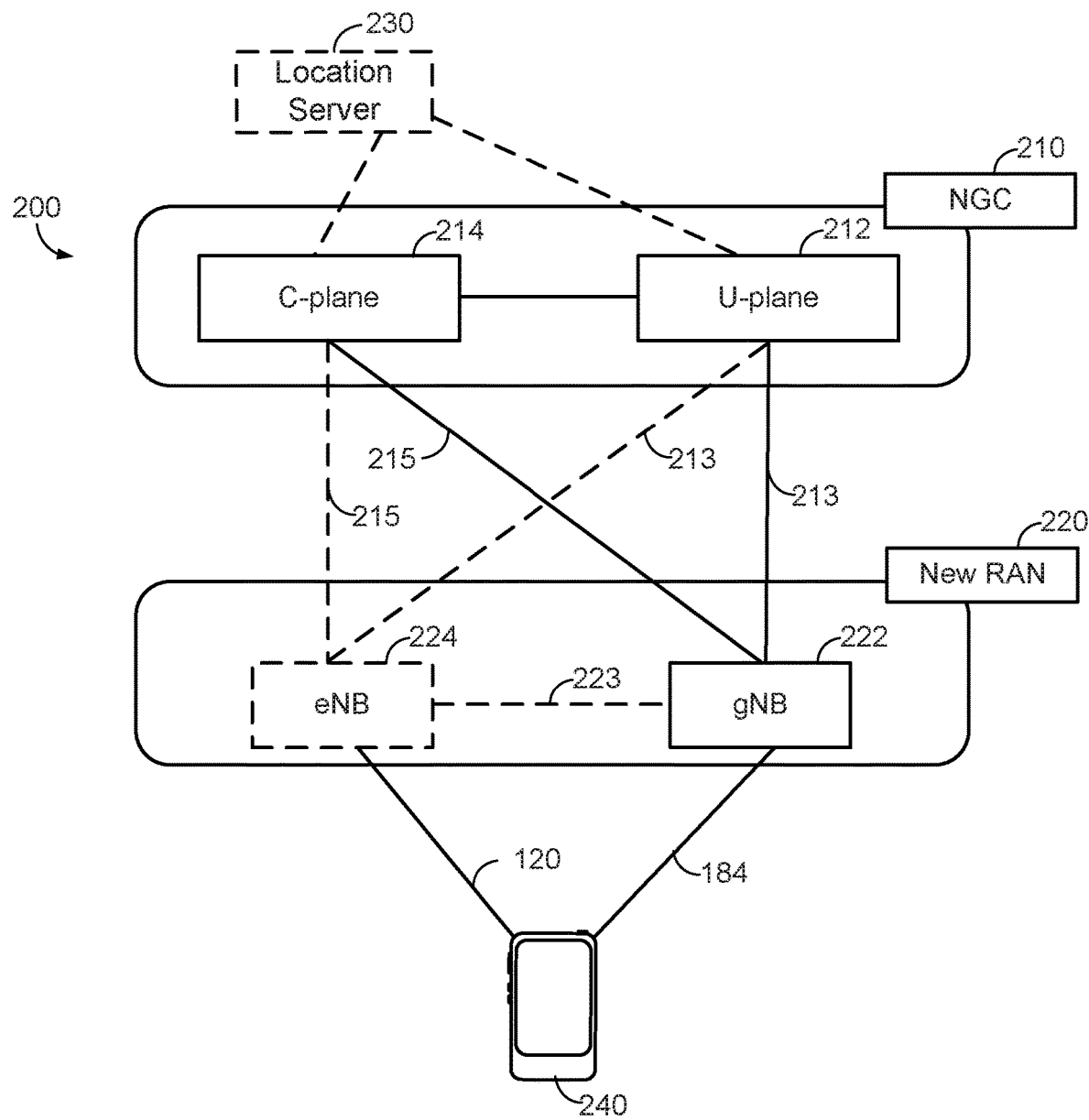
FIGS. 2A and 2B illustrate example wireless network structures, according to various aspects.

According to various aspects, FIG. 2A illustrates an example wireless network structure 200. For example, an NGC 210 can be viewed functionally as control plane functions 214 (e.g., UE registration, authentication, network access, gateway selection, etc.), and user plane functions 212 (e.g., UE gateway function, access to data networks, Internet protocol (IP) routing, etc.), which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include a location server 230 that may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
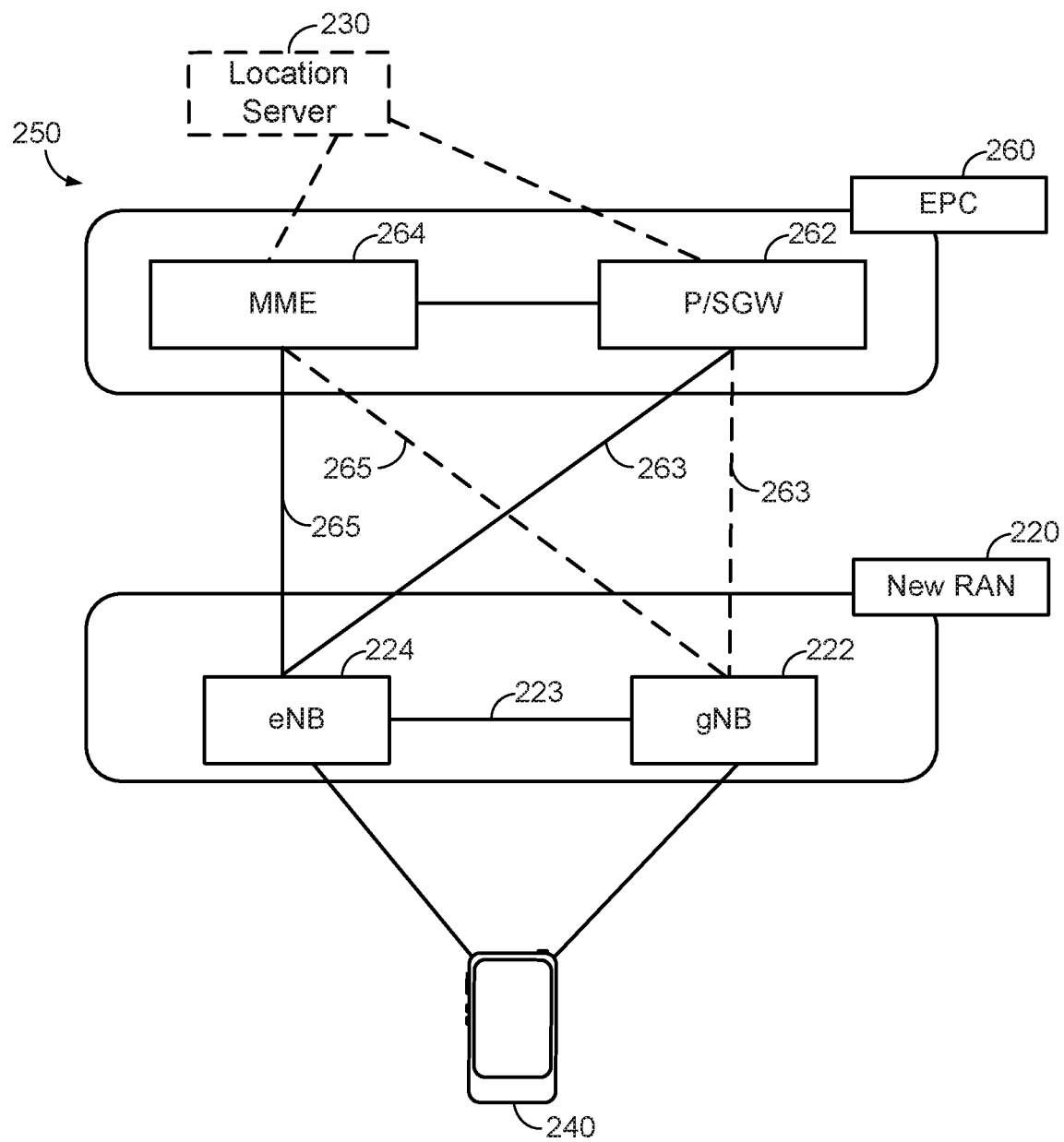

According to various aspects, FIG. 2B illustrates another example wireless network structure 250. For example, the EPC 260 can be viewed functionally as control plane functions, mobility management entity (MME) 264 and user plane functions, packet data network gateway/serving gateway (P/SGW) 262, which operate cooperatively to form the core network. S1 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the EPC 260 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, EPC 260, and/or via the Internet (not illustrated).

Figure 3:
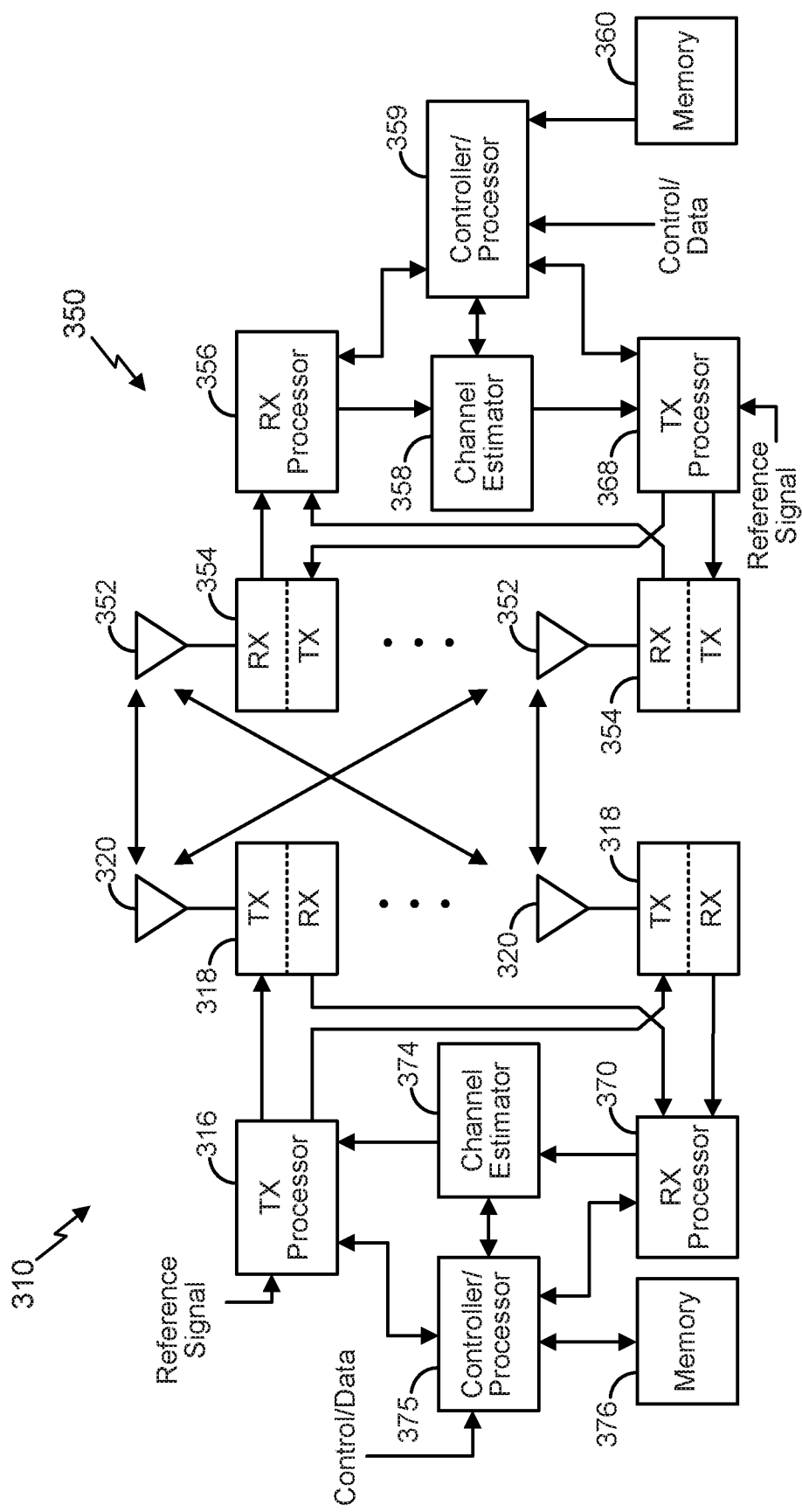
FIG. 3 illustrates an exemplary base station and an exemplary UE in an access network, according to various aspects.

According to various aspects, FIG. 3 illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a non-transitory computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a non-transitory computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 4:
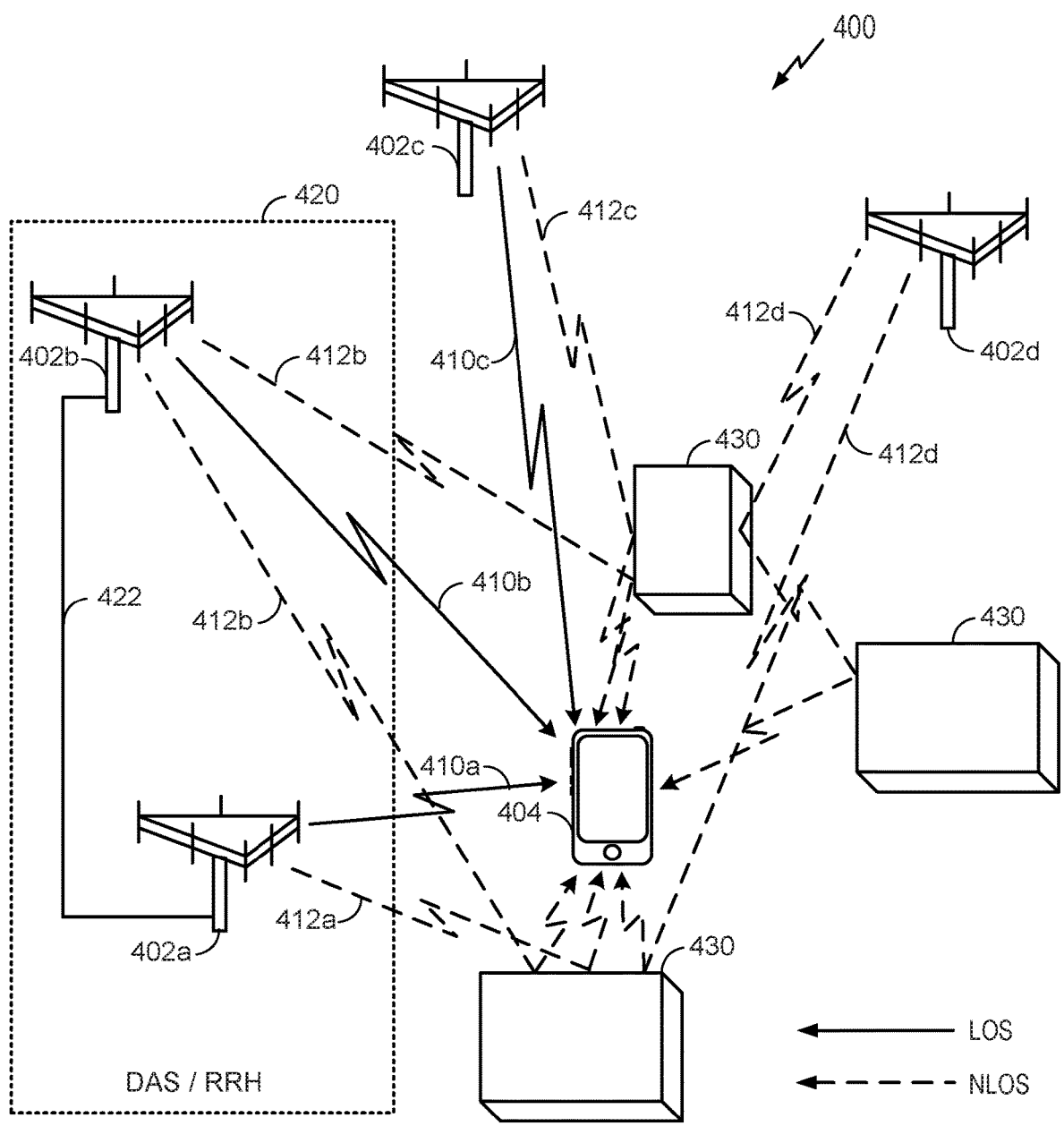
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations' 402 locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference RF signals. Further, as used herein, a "node" may refer to either a network node or a UE.

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. As described further herein, the UE 404 (e.g., based in part on the assistance data, if provided) can measure and (optionally) report the RTT between itself and individual network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE (e.g., UE 404), which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as, for example, a "position method" or as a "positioning method." A position estimate may include an expected error or uncertainty (e.g., by including an area or volume within which the location is expected to be included with some specified or default level of confidence).

To support position estimates, the base stations 402 may be configured to broadcast reference RF signals (e.g., positioning reference signals (PRS), cell-specific reference signals (CRS), channel state information reference signals (CSI-RS), narrowband reference signals (NRS), synchronization signals, etc.) to UEs 404 in their coverage area to enable a UE 404 to measure the RTT between the UE 404 and the transmitting base stations 402. In general, the beam of interest for an RTT measurement is the LOS beam, or the beam that excites the shortest RF path (which may be the LOS beam or the NLOS beam following the shortest path to the receiver).

However, RF signals travel not only by the LOS/shortest NLOS path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the received signal received power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beams. That is, in some cases, the signal strength of RF signals on the LOS path 410 may be weaker (e.g., due to obstructions) than the signal strength of RF signals on an NLOS path 412, over which the RF signals arrive later due to propagation delay.

Figure 5:
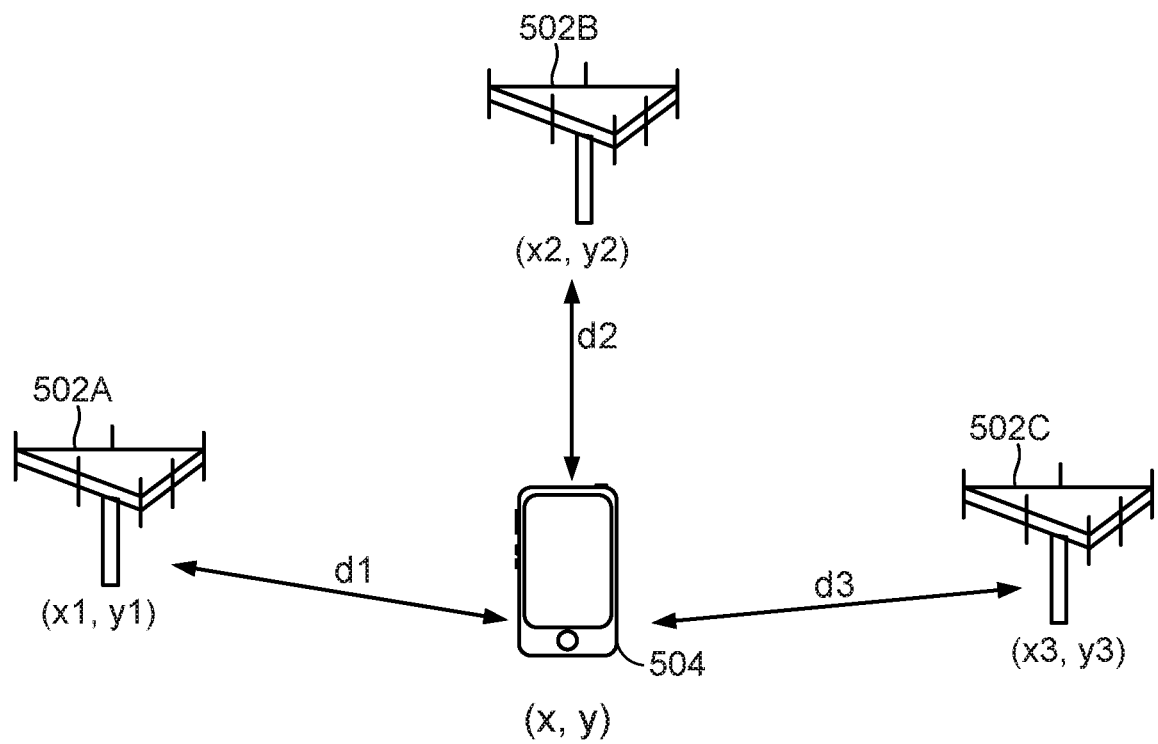
FIG. 5 illustrates an exemplary wireless communications system according to various aspects of the disclosure.

As briefly noted above, a UE can be configured to measure and report the RTT of reference RF signals transmitted between itself and one or more network nodes (e.g., different base stations or different transmission points (e.g., antennas) belonging to the same base station). A simplified environment is shown in FIG. 5 for illustrating an exemplary technique for determining a position of a UE 504. In the example of FIG. 5, the UE 504 may communicate wirelessly with a plurality of base stations 502A-C using RF signals and standardized protocols for the modulation of the RF signals and the exchange of information packets. By extracting different types of information from the exchanged RF signals, and utilizing the layout of the network (e.g., the network geometry) the UE 504 may determine its position in a predefined reference coordinate system. As shown in FIG. 5, the UE 504 may specify its position (x, y) using a two-dimensional coordinate system; however, the aspects disclosed herein are not so limited, and may also be applicable to determining positions using a three-dimensional coordinate system, if the extra dimension is desired. Additionally, while three base stations 502A-C are shown in FIG. 5, aspects may utilize additional base stations. Further, although illustrated as separate base stations, two or more of the base stations 502A-C may instead be different transmission points (e.g., antennas) of the same base station 502.

In order to determine its position (x, y), the UE 504 may first need to determine the network geometry. The network geometry can include the geographic locations of each of the base stations 502A-C in a reference coordinate system (e.g., $(x_k, y_k)$, where k=1, 2, 3). The network geometry may be provided to the UE 504 in any manner, such as providing this information in beacon signals, providing the information using a dedicated server external on an external network (e.g., a location server 230), providing the information using uniform resource identifiers, etc.

The UE 504 may then determine a distance ($d_k$, where k=1, 2, 3) to each of the base stations 502A-C. There are a number of different approaches for estimating these distances ($d_k$) by exploiting different characteristics of the RF signals exchanged between the UE 504 and the base stations 502A-C. Such characteristics may include, as will be discussed below, the round trip propagation time (e.g., RTT) of the RF signals, and/or the strength of the signals (e.g., received signal strength indicator (RSSI)). Once each distance is determined, the UE 504 can then solve for its position (x, y) by using a variety of known geometric techniques, for example, trilateration.

Determining the distance between the UE 504 and each base station 502A-C may involve exploiting time information of the RF signals. In an aspect, determining the RTT of RF signals exchanged between the UE 504 and a base station 502A-C can be performed and converted to a distance ($d_k$). RTT techniques can measure the time between sending a data packet and receiving a response. These methods utilize calibration to remove any processing delays. In some environments, it may be assumed that the processing delays for the UE 504 and the base stations 502A-C are the same. However, such an assumption may not be true in practice.

Figure 6A:
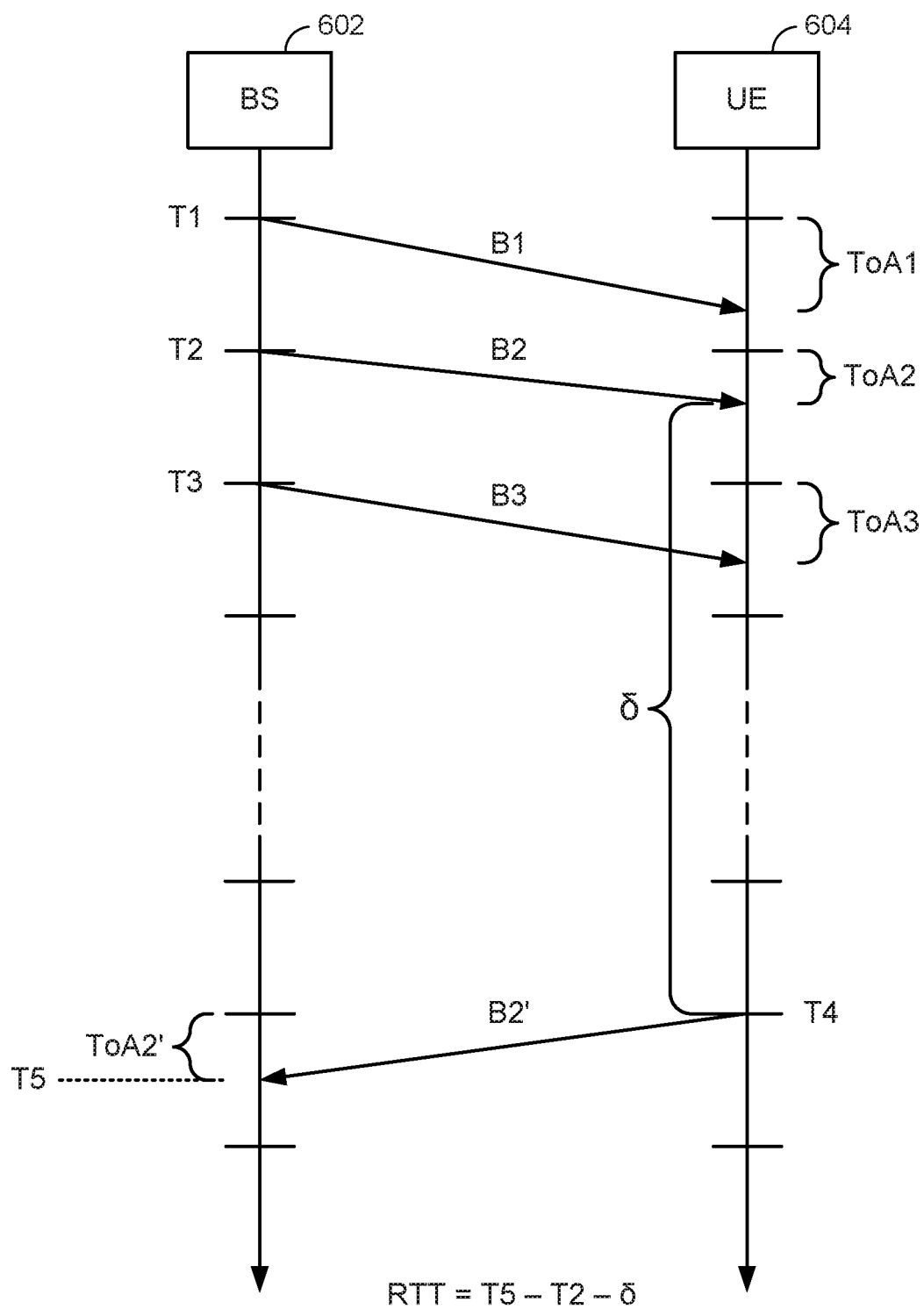
FIG. 6A illustrates a conventional RTT procedure between two nodes.

FIG. 6A illustrates a conventional RTT procedure between two nodes, a base station (BS) 602 and a UE 604. The base station 602 may correspond to base station 310 in FIG. 3, and UE 604 may correspond to UE 350 in FIG. 3. In FIG. 6A, each horizontal hash mark on the vertical line under the UE 604 represents the start of a receive (RX) search and is based on the UE's 604 local clock. The UE's 604 local clock is synchronized with the base station's 602 clock, providing a near-constant offset between the two clocks. As such, the hash marks on the vertical line under the base station 602 also represent the start times of the UE's 604 receive searches.

In a network-centric RTT estimation, the serving base station instructs the UE (e.g., UE 604) to look for RTT signals (e.g., downlink timing reference signals) from one or more base stations (e.g., base station 602). As illustrated in FIG. 6A, the base station 602 transmits a beam of downlink reference signals (e.g., synchronization signal block (SSB) or CSI-RS) at the start of each receive search (illustrated as beams B1, B2, and B3). In the example of FIG. 6A, the base station 602 transmits beam B1 at time T1, beam B2 at time T2, and beam B3 at time T3. Although FIG. 6A illustrates the base station 602 transmitting a single beam at the beginning of a receive search, as will be appreciated, the base station 602 may use beamforming to transmit multiple beams at each of times T1, T2, and T3. The base station 602 may transmit the downlink reference signals on low reuse resources, allocated by the network (e.g., a location server).

Figure 6B:
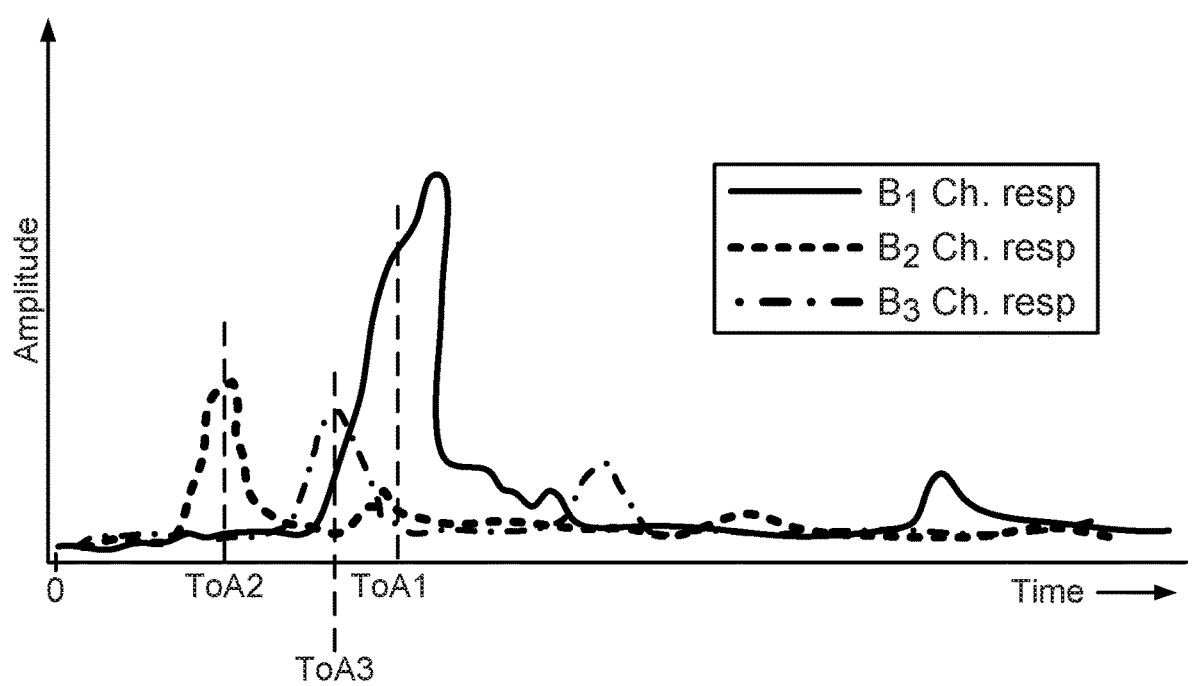
FIG. 6B is a graph showing the RF channel response at a UE over time according to aspects of the disclosure.

The UE 604 receives each beam B1, B2, and B3 and estimates the time of arrival (ToA) of each beam from the start of the receive search in which it was received. In the example of FIG. 6A, beam B1 has a ToA of ToA1, beam B2 has a ToA of ToA2, and beam B3 has a ToA of ToA3. The UE 604 then identifies which beam has the "earliest ToA" (possibly subject to a beam strength/RSRP condition). In the example of FIG. 6A, as illustrated in FIG. 6B, the earliest ToA is ToA2, and thus, beam B2 is identified as the earliest arriving beam. Beam B2 is therefore considered the LOS beam and can be used for calculating the RTT.

After some predetermined time delay δ from the earliest ToA (e.g., ToA2), the UE 604 transmits a timing response (TR) signal (e.g., random access channel (RACH) preamble or sounding reference signal (SRS)) at time T4 (illustrated as beam B2'). The network may allocate low reuse resources for the UE 604 to transmit the timing response signal. In an aspect, the predetermined time delay δ may depend on the identifier (ID) of the identified beam, i.e., δ=δ(beamID). Thus, in the example of FIG. 6A, the predetermined time delay δ may be a function of the identifier of beam B2. More specifically, in the example of FIG. 6A, beam B2 and ToA2 will determine the precise transmission timing for the uplink timing response (T4). More specifically, beam B2 determines the transmission beam B2' used by the UE 604 and the RACH/timing response occasion index, and ToA2 determines the precise start time of the preamble transmission. Additionally, or alternatively, the frequency resource or transmitted sequence may also depend on the identifier of the identified beam.

At time T5, the base station 602 receives the timing response from the UE 604 and estimates the ToA of the timing response. In the example of FIG. 6A, the ToA of the timing response is ToA2'. The base station 602 also determines the identifier of the downlink beam selected by the UE 604 (e.g., the identifier of beam B2) from the timing response.

Since the base station 602 knows the time of transmission of the selected beam (e.g., T2), the ToA of the timing response (e.g., T5), and the predetermined time delay (δ), the base station 602 is able to estimate the RTT. Specifically, the RTT estimate is the ToA of the timing response (T5) minus the time of transmission of the downlink beam selected by the UE 604 (T2) minus the predetermined time delay (δ).

As discussed above, for RTT estimation, both nodes work together to identify and measure the propagation delay of the shortest radio path. That is, the beam used for the downlink timing reference signal and the uplink timing response is the one that excites the shortest radio path between the two nodes. However, there are various issues with identifying the correct beam pair (e.g., beams B2 and B2') for RTT-based positioning. For example, where a base station uses beamforming to transmit RF signals, the beam of interest for performing RTT estimation will be the beam carrying RF signals that excite the shortest path, or the LOS path. However, as noted above, in some frequency bands, the signal strength of RF signals on the LOS path may be weaker (e.g., due to obstructions) than the signal strength of RF signals on an NLOS path, over which the RF signals arrive later due to propagation delay. Thus, in the example of FIGS. 6A and 6B, the beam B2 may excite the shortest radio path but could be weaker than other beams, leading to higher misdetection, whereas beam B1 may have the strongest RSRP and therefore be preferred for data communications. As such, it would be beneficial to be able to use the strongest (i.e., most detectable) beam for RTT estimation, even if it is not the earliest arriving beam.

The techniques of the present disclosure use a strong beam—that may not excite the shortest radio path—for RTT estimation by applying a suitable timing advance (TA) to the uplink timing response transmission. The timing advance corrects for the increased propagation delay of the longer radio path (with respect to the shortest, albeit weaker, radio path). That is, the UE will use a strong beam instead of the earliest beam to transmit the timing response (e.g., RACH preamble), but advance the transmission time of the timing response by a suitable amount to make up for the longer propagation delay of the strong beam.

Referring to FIG. 6B, beam B2 has the earliest ToA, ToA2, but beam B1, with a ToA of ToA1, has the highest RSRP. As described with reference to FIG. 6A, conventionally, beam B2 would be selected for the RTT estimation. However, using the techniques described further below, a UE can instead select beam B1 for the RTT estimation. More specifically, the UE can transmit the timing response in the RACH occasion (RO) corresponding to beam B1, using a reciprocal uplink beam B1'. Additionally, the UE can apply a timing advance to the usual transmission time (i.e., the predetermined time delay δ from ToA1) of the timing response corresponding to beam B1. The proposed timing advance is twice the difference between the ToAs of the earliest arriving beam and the strongest beam, or, with reference to FIGS. 6A and 6B, 2(ToA1−ToA2), denoted $2\delta_{12}$. Thus, the transmission time of the timing response will be after a delay of the predetermined time delay δ minus $2\delta_{12}$ from ToA1 (the ToA of the selected beam, beam B1).

In the case of multiple timing response transmissions, a UE can perform multiple timing response transmissions corresponding to different beams and using beam-specific timing advance correction. For example, the UE 604 can additionally transmit a timing response using beam pair (B3, B3') in the RO corresponding to beam B3, using the timing advance $2\delta_{32}$, where $\delta_{32}$ is equivalent to ToA3 minus ToA2.

Figure 7:
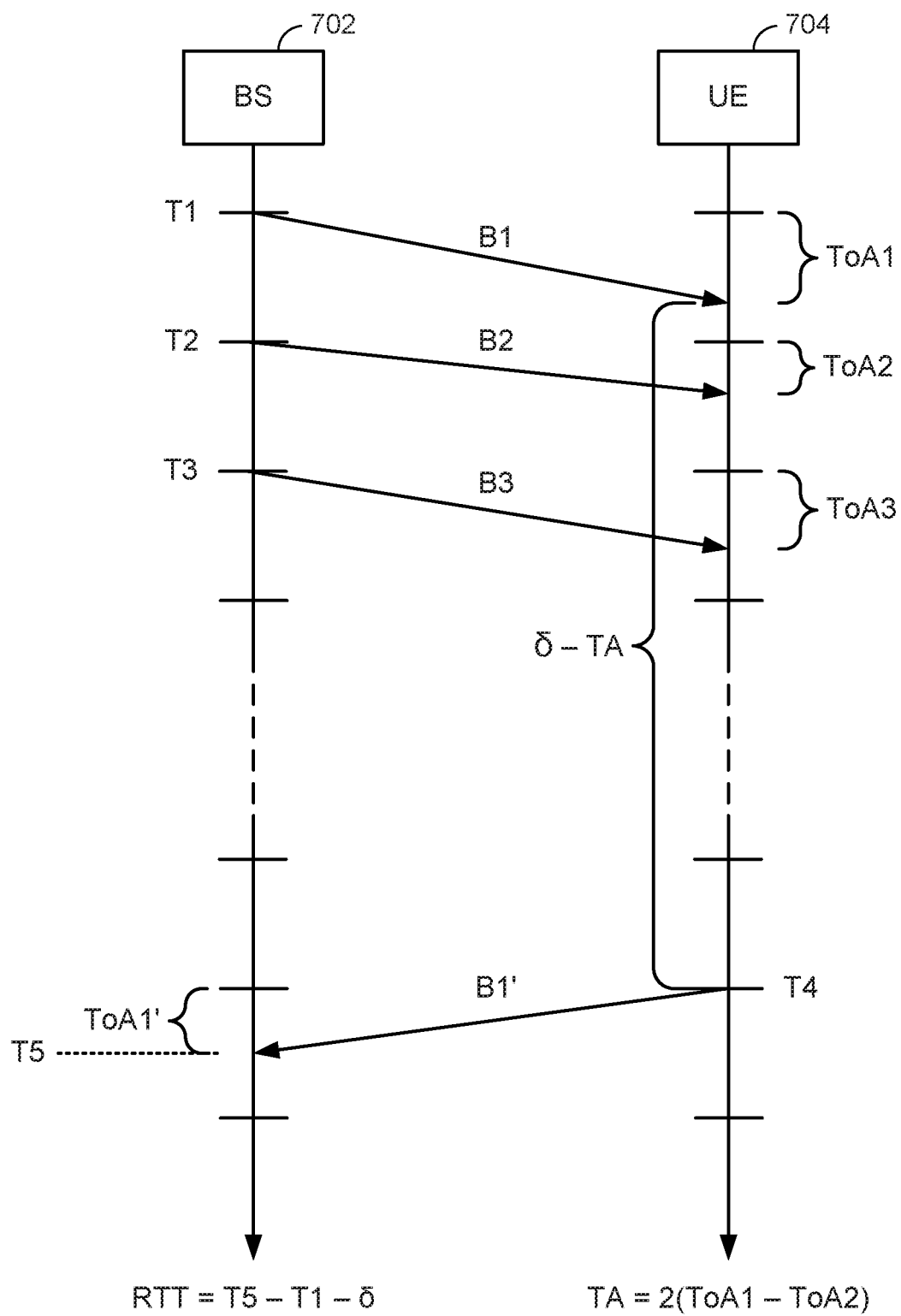
FIG. 7 illustrates an RTT procedure between two nodes, according to at least one aspect of the disclosure.

FIG. 7 illustrates an RTT procedure between two nodes, a base station 702 and a UE 704, according to aspects of the disclosure. The base station 702 may correspond to base station 310 in FIG. 3, and UE 704 may correspond to UE 350 in FIG. 3. As in FIG. 6A, in FIG. 7, each horizontal hash mark on the vertical line under the UE 704 represents the start of a receive (RX) search and is based on the UE's 704 local clock. The UE's 704 local clock is synchronized with the base station's 702 clock, providing a near-constant offset between the two clocks. As such, the hash marks on the vertical line under the base station 702 also represent the start times of the UE's 704 receive searches.

As illustrated in FIG. 7, the base station 702 transmits a beam of downlink reference signals (e.g., SSB or CSI-RS) at the start of each receive search (illustrated as beams B1, B2, and B3). In the example of FIG. 7, the base station 702 transmits beam B1 at time T1, beam B2 at time T2, and beam B3 at time T3. Although FIG. 7 illustrates the base station 702 transmitting a single beam at the beginning of a receive search, as will be appreciated, the base station 702 may use beamforming to transmit multiple beams at each of times T1, T2, and T3. The base station 702 may transmit the downlink reference signals on low reuse resources, allocated by the network (e.g., a location server).

The UE 704 receives each beam B1, B2, and B3 and estimates the ToA of each beam from the start of the receive search in which it was received. In the example of FIG. 7, beam B1 has a ToA of ToA1, beam B2 has a ToA of ToA2, and beam B3 has a ToA of ToA3. The UE 704 then identifies which beam has the "earliest ToA" (possibly subject to a beam strength/RSRP condition). In the example of FIG. 7, as in FIG. 6A and as illustrated in FIG. 6B, the earliest ToA is ToA2, and thus, beam B2 is identified as the earliest arriving beam.

However, unlike the procedure illustrated in FIG. 6A, the UE 704 selects the one or more beams having the highest, or some value above a threshold, beam strength metric (e.g., RSRP, weighted RSRP, etc.). In the example of FIG. 7, beam B1 has the highest beam strength. In an aspect, the base station 702 may configure the UE 704 with a threshold for the beam strength metric (e.g., RSRP threshold, or threshold on required transmit power, or threshold on deficit in required transmission power, or the like). In that case, if a beam with the "earliest" ToA meets the threshold condition, then the base station 702 may configure the UE 704 to select that beam; otherwise, in an aspect, the UE 704 may select one of two alternatives. The first alternative is that the UE 704 is free to select any beam. The second alternative is that if at least one beam meets the threshold condition, then the base station 702 may instruct the UE 704 to select a beam that meets the threshold condition; otherwise, the UE 704 is free to select any beam.

For each selected beam (e.g., beam B1), the UE 704 computes a timing statistic (e.g., ToA, mean excess delay, time of strongest channel tap, etc. of the selected beam), a timing difference (the timing statistic minus the earliest ToA) for the selected beam, and the timing advance (twice the timing difference). The timing statistic may be dictated by the base station 702, or specified in the governing standard. In the example of FIG. 7, the timing statistic is ToA (ToA1), the timing difference is ToA1−ToA2 (the earliest ToA), and the timing advance is 2(ToA1−ToA2). The timing advance represents the difference in time between the earliest ToA of all of the received beams and the (later) timing statistic (e.g., ToA) of the selected beam.

For each selected beam (here, beam B1), the UE 704 transmits a timing response signal. The transmission time (e.g., start of transmission) of the timing response is at the predetermined time delay δ (as described above with reference to FIG. 6A) but, unlike the procedure illustrated in FIG. 6A, minus the timing advance from the timing statistic (e.g., ToA) of the selected beam, represented as time T4. That is, transmission time T4 is the predetermined time delay δ minus the timing advance (2(ToA1−ToA2)) from ToA1. By subtracting the timing advance from the predetermined time delay δ, the UE 704 transmits the timing response for the selected beam at the same time (T4) that the UE 704 would have transmitted the timing response for that beam if it were the earliest arriving beam.

More specifically, the predetermined time delay δ may depend on the identifier of the selected beam, i.e., δ=δ (beamID). In the example of FIG. 7, the predetermined time delay δ would therefore be a function of the identifier of beam B1. Thus, the predetermined time delay δ may be different for different beams. Because the UE 704 is reporting a different beam than the earliest arriving beam in the timing response, but the base station 702 is expecting to receive a timing response for the earliest arriving beam, the UE 704 needs to adjust the transmission time of the timing response for the selected beam such that the selected beam appears to be the earliest arriving beam and therefore reflects the actual RTT between the UE 704 and the base station 702. As such, the UE 704 subtracts the timing advance from the predetermined time delay δ for the selected beam (beam B1), thereby transmitting the timing response for the selected beam at the same time (T4) that the UE 704 would have transmitted the timing response for that beam if it were the earliest arriving beam.

In an aspect, because the UE 704 may not select the "earliest arriving" beam for transmitting the timing response, the base station 702 may not know the identifier of the earliest arriving beam, which could still be useful for positioning. Therefore, the UE 704 can send, to the base station 702, the identifier of the beam whose ToA is the earliest ToA (e.g., beam B2 in the example of FIG. 7). The UE 704 can also report the angle of arrival (AoA) of the earliest arriving beam, to further assist in positioning.

At time T5, the base station 702 receives the timing response from the UE 704 and estimates a timing statistic (the same timing statistic calculated by the UE 704, e.g., ToA, mean excess delay, time of strongest channel tap, etc.) of the timing response. In the example of FIG. 7, the timing statistic of the timing response is ToA, specifically, ToA1'. The base station 702 also determines the identifier of the downlink beam selected by the UE 704 (e.g., the identifier of beam B1) from the timing response.

Since the base station 702 knows the time of transmission of the selected beam (e.g., T1), the timing statistic (ToA) of the timing response (e.g., T5), and the predetermined time delay (δ), the base station 702 is able to estimate the RTT. Specifically, the RTT estimate is the timing statistic (e.g., ToA) of the timing response (T5) minus the time of transmission of the downlink beam selected by the UE 704 (T1) minus the predetermined time delay (δ). Because the UE 704 has already adjusted the time at which it transmits the timing response (T4), by subtracting twice the difference between the earliest ToA (ToA2) and the timing statistic of the selected beam (ToA1), there is no need for the base station 702 to further adjust the RTT calculation; rather, the base station 702 can simply use the predetermined time delay δ.

The RTT estimate may be used subsequently for positioning, for example, where the location of the base station 702 is known and the location of the UE 704 is unknown and is estimated using RTT. RTT position estimation usually utilizes the RTT from several nodes with known positions. Further, the RTT estimate may subsequently be used to synchronize the two nodes, for example, by synchronizing a relay node's downlink timing to the downlink timing of a donor base station.

Note that although FIGS. 6A and 7 illustrate beams B1 to B3 being transmitted at separate times, they may be transmitted at the same time. Additionally, the base station 702 and the UE 704 may switch roles, where the UE 704 transmits the reference signal and the base station 702 transmits the timing response.

There are various extensions to the techniques described herein. For example, on an aspect, if the base station (e.g., base station 702) instructs the UE (e.g., UE 704) to trigger a RACH procedure for RTT estimation, then the base station does not send a random access response (RAR) (also referred to as a "Msg2") to the UE and the UE does not search for or attempt to decode an RAR.

Further, the base station may convey the estimated RTT (or a value based on the estimated RTT) to the UE in a MAC control element (MAC-CE) and/or an RAR message that contains a random access preamble identifier (RAPID) and the estimated RTT, or a value based on the estimated RTT, but that does not contain an RAR grant.

Figure 8:
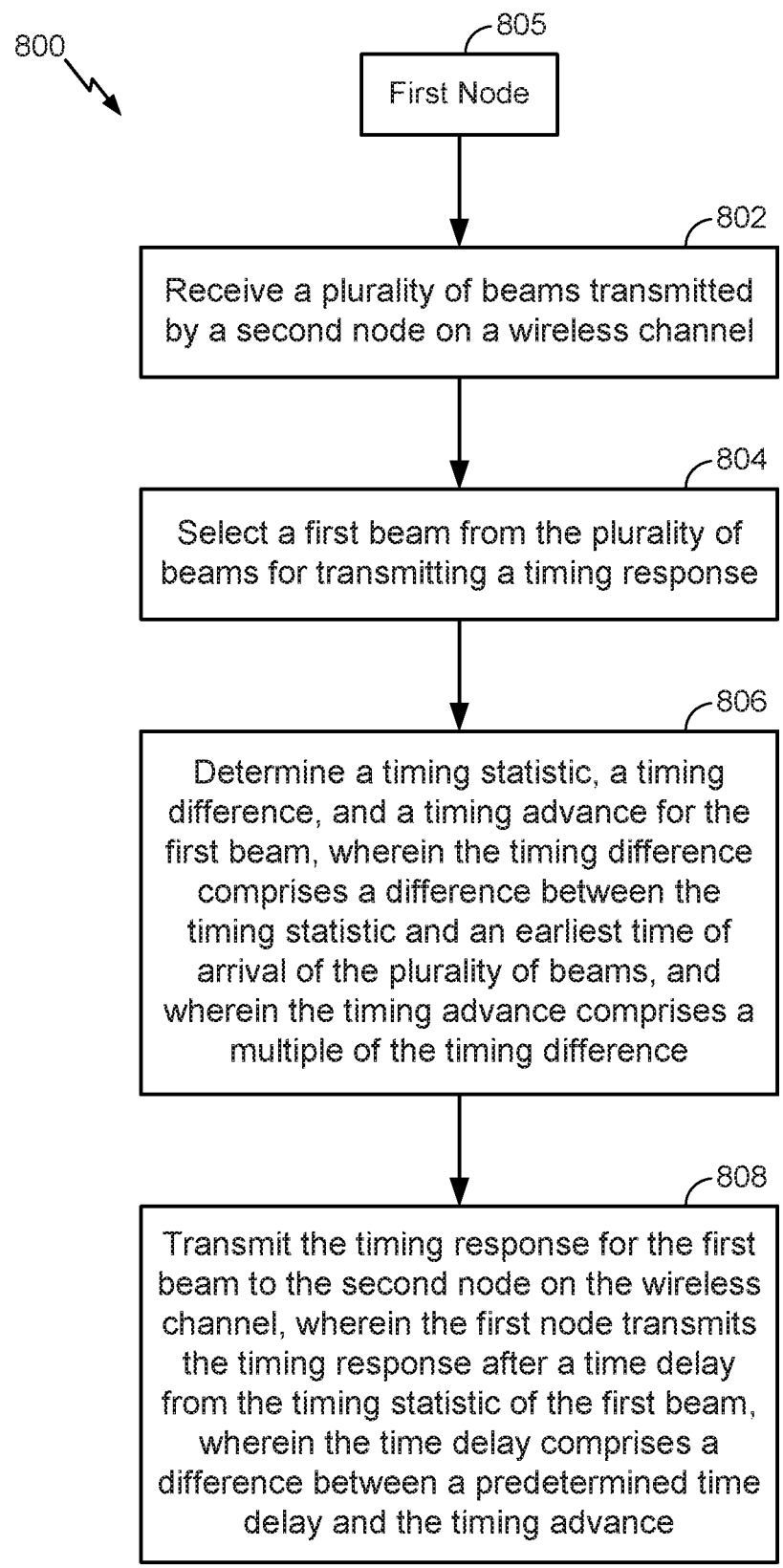
FIGS. 8-9 illustrate exemplary methods, according to various aspects of the disclosure.

FIG. 8 illustrates an exemplary method 800 for determining a beam-specific timing advance for RTT estimation according to an aspect of the disclosure. The method 800 may be performed by a first node 805, such as base station 310 or UE 350.

At 802, the first node 805 (e.g., antenna(s) 320, receiver(s) 318, and/or RX processor 370, or antenna(s) 352, receiver(s) 354, and/or RX processor 356) receives a plurality of beams (e.g., beams B1, B2, and B3 in FIG. 7) transmitted by a second node (e.g., the other of base station 310 or UE 350) on a wireless channel. In an aspect, the first beam may be a beam of downlink reference signals. In an aspect, the downlink reference signals may include SSBs, PRS, NRS, timing reference signals, or CSI-RS.

At 804, the first node 805 (e.g., RX processor 370 and/or controller/processor 375, or RX processor 356 and/or controller/processor 359) selects a first beam (e.g., beam B1 in FIG. 7) from the plurality of beams for transmitting a timing response. In an aspect, the first node 805 may select the first beam from the plurality of beams based on a beam strength metric of the first beam. In an aspect, the beam strength metric may be an RSRP of the first beam. In an aspect, the beam strength metric may be the highest beam strength metric of the plurality of beams.

At 806, the first node 805 (e.g., RX processor 370 and/or controller/processor 375, or RX processor 356 and/or controller/processor 359) determines a timing statistic (e.g., ToA1), a timing difference, and a timing advance for the first beam. In an aspect, the timing difference may be a difference between the timing statistic (e.g., ToA1) and an earliest time of arrival of the plurality of beams (e.g., ToA2), and the timing advance may be a multiple (e.g., 2) of the timing difference. In an aspect, the timing statistic may be a ToA of the first beam, a mean excess delay of the first beam, or a time of the strongest channel tap of the first beam. In an aspect, the timing statistic of the first beam may occur after the earliest time of arrival of the plurality of beams.

At 808, the first node 805 (e.g., antenna(s) 320, transmitter(s) 318, and/or TX processor 316, or antenna(s) 352, transmitter(s) 354, and/or TX processor 368) transmits the timing response for the first beam to the second node on the wireless channel. In an aspect, the first node 805 transmits the timing response after a time delay from the timing statistic of the first beam, as discussed above with respect to FIG. 7. The time delay may be a difference between a predetermined time delay (e.g., δ for the selected beam) and the timing advance. In an aspect, the timing response may identify the first beam.

In an aspect, the method 800 may further include (not shown) identifying a beam of the plurality of beams having the earliest time of arrival. In that case, the method 800 may further include reporting the identified beam to the second node.

In an aspect, the method 800 may further include (not shown) selecting, by the first node 805, a second beam from the plurality of beams based on a second beam strength metric of the second beam, determining, by the first node 805, a second timing statistic, a second timing difference, and a second timing advance for the second beam, the second timing difference comprising a difference between the second timing statistic and the earliest time of arrival of the plurality of beams, and the second timing advance comprising a multiple of the second timing difference, and transmitting, by the first node 805, a second timing response for the second beam to the second node, the first node 805 transmitting the second timing response after a second time delay from the second timing statistic of the second beam, and the second time delay comprising a difference between the predetermined time delay and the second timing advance. In an aspect, the first node 805 may select the second beam from the plurality of beams based on a first beam strength metric of the first beam and a second beam strength metric of the second beam. In an aspect, the first beam strength metric may be the highest beam strength metric of the plurality of beams and the second beam strength metric is the second highest beam strength metric of the plurality of beams. In an aspect, the first node 805 may select the first beam and the second beam simultaneously.

Figure 9:
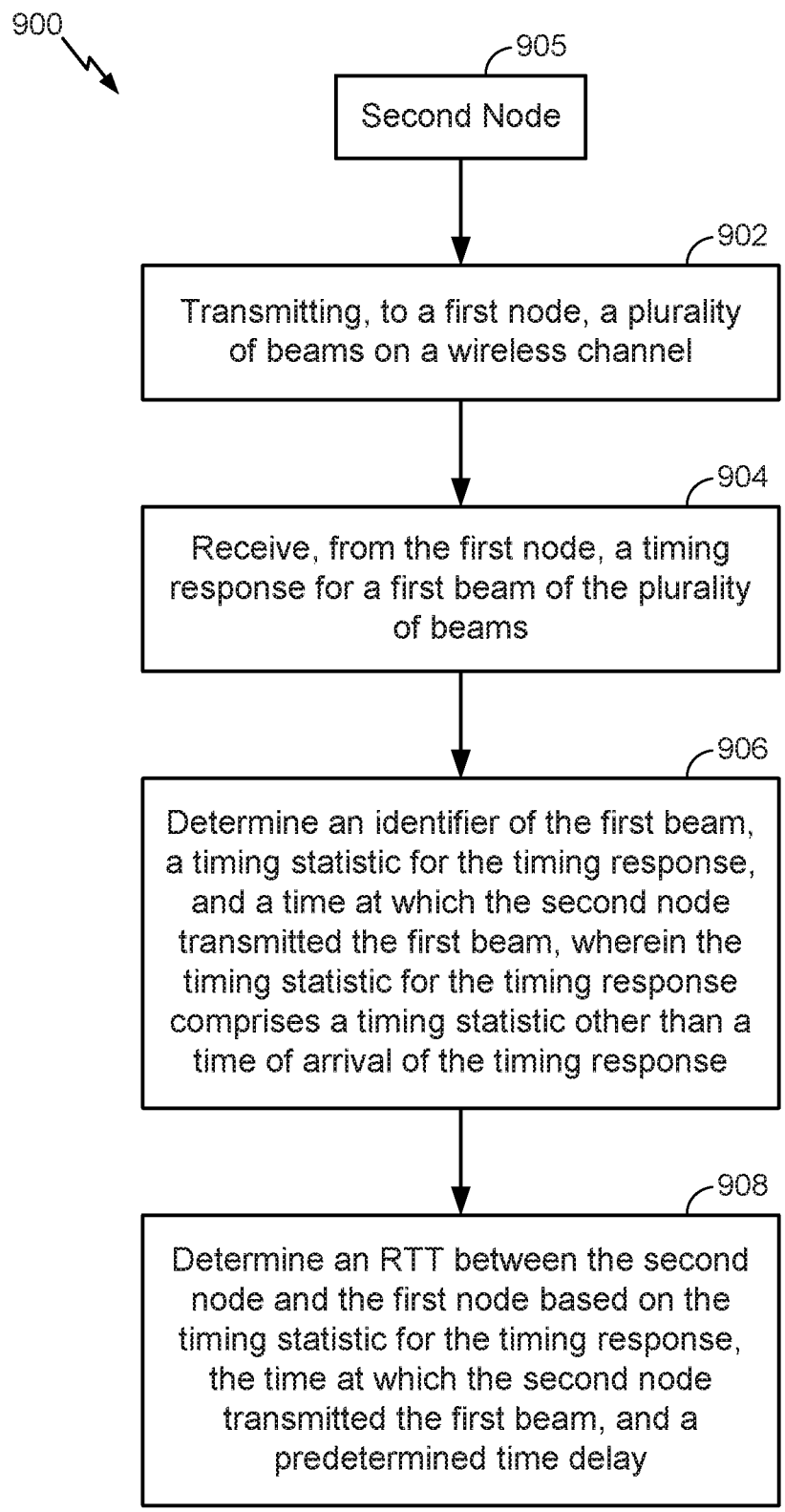

FIG. 9 illustrates an exemplary method 900 for determining a beam-specific timing advance for RTT estimation according to an aspect of the disclosure. The method 900 may be performed by a second node 905, such as base station 310 or UE 350.

At 902, the second node 905 (e.g., antenna(s) 320, transmitter(s) 318, and/or TX processor 316, or antenna(s) 352, transmitter(s) 354, and/or TX processor 368) transmits, to a first node (e.g., the other of base station 310 or UE 350), a plurality of beams (e.g., beams B1, B2, and B3 in FIG. 7) on a wireless channel. In an aspect, the plurality of beams may be a plurality of beams of downlink reference signals. In an aspect, the downlink reference signals may include SSBs, PRS, NRS, timing reference signals, or CSI-RS.

At 904, the second node 905 (e.g., antenna(s) 320, receiver(s) 318, and/or RX processor 370, or antenna(s) 352, receiver(s) 354, and/or RX processor 356) receives, from the first node, a timing response for a first beam (e.g., beam B1) of the plurality of beams. In an aspect, the timing response may identify the first beam.

At 906, the second node 905 (e.g., RX processor 370 and/or controller/processor 375, or RX processor 356 and/or controller/processor 359) determines an identifier of the first beam, a timing statistic for the timing response (e.g., ToA1' in FIG. 7), and a time at which the second node 905 transmitted the first beam (e.g., T1 in FIG. 7). The timing statistic for the timing response may be a timing statistic other than a time of arrival of the timing response. In an aspect, the timing statistic may be a mean excess delay of the timing response or a time of the strongest channel tap of the timing response.

At 908, the second node 905 (e.g., RX processor 370 and/or controller/processor 375, or RX processor 356 and/or controller/processor 359) determines an RTT between the second node 905 and the first node based on the timing statistic for the timing response, the time at which the second node 905 transmitted the first beam, and a predetermined time delay, as discussed above with reference to FIG. 7.

In an aspect, the method 900 may further include (not shown) receiving, by the second node 905 from the first node, an identifier of a beam of the plurality of beams having the earliest time of arrival.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for determining a beam-specific timing advance for Round-Trip Time (RTT) estimation, comprising:
   receiving, at a first node, a plurality of beams transmitted by a second node on a wireless channel;
   selecting, by the first node, a first beam from the plurality of beams for transmitting a timing response;
   determining, by the first node, a timing statistic, a timing difference, and a timing advance for the first beam, wherein the timing difference comprises a difference between the timing statistic and an earliest time of arrival of the plurality of beams, and wherein the timing advance comprises a multiple of the timing difference; and
   transmitting, by the first node, the timing response for the first beam to the second node on the wireless channel, wherein the first node transmits the timing response after a time delay from the timing statistic of the first beam, wherein the time delay comprises a difference between a predetermined time delay and the timing advance.

2. The method of claim 1, further comprising identifying a beam of the plurality of beams having the earliest time of arrival.

3. The method of claim 2, further comprising reporting the identified beam to the second node.

4. The method of claim 1, wherein the timing response identifies the first beam.

5. The method of claim 1, wherein the first node selects the first beam from the plurality of beams based on a beam strength metric of the first beam.

6. The method of claim 5, wherein the beam strength metric comprises a reference signal received power (RSRP) of the first beam.

7. The method of claim 5, wherein the beam strength metric is the highest beam strength metric of the plurality of beams.

8. The method of claim 1, wherein the timing statistic comprises a time of arrival (ToA) of the first beam, a mean excess delay of the first beam, or a time of the strongest channel tap of the first beam.

9. The method of claim 1, wherein the timing statistic of the first beam occurs after the earliest time of arrival of the plurality of beams.

10. The method of claim 1, wherein the first beam comprises a beam of downlink reference signals.

11. The method of claim 10, wherein the downlink reference signals comprise synchronization signal blocks (SSBs), positioning reference signals (PRS), narrowband reference signals (NRS), timing reference signals, or channel state information reference signals (CSI-RS).

12. The method of claim 1, further comprising:
   selecting, by the first node, a second beam from the plurality of beams based on a second beam strength metric of the second beam;
   determining, by the first node, a second timing statistic, a second timing difference, and a second timing advance for the second beam, wherein the second timing difference comprises a difference between the second timing statistic and the earliest time of arrival of the plurality of beams, and wherein the second timing advance comprises a multiple of the second timing difference; and
   transmitting, by the first node, a second timing response for the second beam to the second node, wherein the first node transmits the second timing response after a second time delay from the second timing statistic of the second beam, wherein the second time delay comprises a difference between the predetermined time delay and the second timing advance.

13. The method of claim 12, wherein the first node selects the second beam from the plurality of beams based on a first beam strength metric of the first beam and a second beam strength metric of the second beam.

14. The method of claim 13, wherein the first beam strength metric is the highest beam strength metric of the plurality of beams and the second beam strength metric is the second highest beam strength metric of the plurality of beams.

15. The method of claim 12, wherein the first node selects the first beam and the second beam simultaneously.

16. The method of claim 1, wherein the multiple of the timing difference is a multiple of two (2).

17. The method of claim 1, wherein the first node comprises a user device and the second node comprises a base station.

18. The method of claim 1, wherein the first node comprises a base station and the second node comprises a user device.

19. A method for determining a beam-specific timing advance for Round-Trip Time (RTT) estimation, comprising:
   transmitting, to a first node by a second node, a plurality of beams on a wireless channel;
   receiving, at the second node from the first node, a timing response for a first beam of the plurality of beams;
   determining, by the second node, an identifier of the first beam, a timing statistic for the timing response, and a time at which the second node transmitted the first beam, wherein the timing statistic for the timing response comprises a timing statistic other than a time of arrival of the timing response; and
   determining, by the second node, an RTT between the second node and the first node based on the timing statistic for the timing response, the time at which the second node transmitted the first beam, and a predetermined time delay.

20. The method of claim 19, further comprising receiving, by the second node from the first node, an identifier of a beam of the plurality of beams having the earliest time of arrival.

21. The method of claim 19, wherein the timing response identifies the first beam.

22. The method of claim 19, wherein the timing statistic comprises a mean excess delay of the timing response or a time of the strongest channel tap of the timing response.

23. The method of claim 19, wherein the first beam comprises a beam of downlink reference signals.

24. The method of claim 23, wherein the downlink reference signals comprise synchronization signal blocks (SSBs), positioning reference signals (PRS), narrowband reference signals (NRS), timing reference signals, or channel state information reference signals (CSI-RS).

25. The method of claim 19, wherein the first node comprises a user device and the second node comprises a base station.

26. The method of claim 19, wherein the first node comprises a base station and the second node comprises a user device.

27. An apparatus for determining a beam-specific timing advance for Round-Trip Time (RTT) estimation, comprising:
a transceiver of a first node configured to receive a plurality of beams transmitted by a second node on a wireless channel; and
at least one processor of the first node configured to:
select a first beam from the plurality of beams for transmitting a timing response;
determine a timing statistic, a timing difference, and a timing advance for the first beam, wherein the timing difference comprises a difference between the timing statistic and an earliest time of arrival of the plurality of beams, and wherein the timing advance comprises a multiple of the timing difference; and
cause the transceiver to transmit the timing response for the first beam to the second node on the wireless channel, wherein the first node transmits the timing response after a time delay from the timing statistic of the first beam, wherein the time delay comprises a difference between a predetermined time delay and the timing advance.

28. The apparatus of claim 27, wherein the timing statistic of the first beam occurs after the earliest time of arrival of the plurality of beams.

29. An apparatus for determining a beam-specific timing advance for Round-Trip Time (RTT) estimation, comprising:
a transceiver of a second node configured to:
transmit, to a first node, a plurality of beams on a wireless channel; and
receive, from the first node, a timing response for a first beam of the plurality of beams; and
at least one processor of the second node configured to:
determine an identifier of the first beam, a timing statistic for the timing response, and a time at which the second node transmitted the first beam, wherein the timing statistic for the timing response comprises a timing statistic other than a time of arrival of the timing response; and
determine an RTT between the second node and the first node based on the timing statistic for the timing response, the time at which the second node transmitted the first beam, and a predetermined time delay.

30. The apparatus of claim 29, wherein the timing statistic of the first beam occurs after the earliest time of arrival of the plurality of beams.

* * * * *